US010848931B2

(12) United States Patent
Ramprasad et al.

(10) Patent No.: US 10,848,931 B2
(45) Date of Patent: *Nov. 24, 2020

(54) SYSTEM AND METHOD FOR MODIFYING SETTINGS ON WIRELESS DEVICES

(71) Applicant: TracFone Wireless, Inc., Miami, FL (US)

(72) Inventors: Satish Ramprasad, Miami, FL (US); Sergio Rivera, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 235 days.

This patent is subject to a terminal disclaimer.

(21) Appl. No.: 15/959,859

(22) Filed: Apr. 23, 2018

(65) Prior Publication Data

US 2018/0242121 A1 Aug. 23, 2018

Related U.S. Application Data

(63) Continuation of application No. 14/643,575, filed on Mar. 10, 2015, now Pat. No. 9,955,323.

(60) Provisional application No. 61/950,532, filed on Mar. 10, 2014.

(51) Int. Cl.
*H04W 4/14* (2009.01)
*H04W 8/24* (2009.01)
*H04W 4/50* (2018.01)
*H04W 8/26* (2009.01)

(52) U.S. Cl.
CPC ............ *H04W 4/14* (2013.01); *H04W 8/245* (2013.01); *H04W 4/50* (2018.02); *H04W 8/265* (2013.01)

(58) Field of Classification Search
CPC combination set(s) only.
See application file for complete search history.

(56) References Cited

U.S. PATENT DOCUMENTS

| 8,213,899 | B1 | 7/2012 | Kindred et al. | |
|---|---|---|---|---|
| 2002/0119767 | A1 | 8/2002 | Fieldhouse et al. | |
| 2003/0157925 | A1 | 8/2003 | Sorber et al. | |
| 2005/0207336 | A1 | 9/2005 | Choi et al. | |
| 2008/0130683 | A1* | 6/2008 | Matsui | H04M 1/2748 370/475 |
| 2010/0100876 | A1 | 4/2010 | Glover et al. | |
| 2010/0205539 | A1 | 8/2010 | Gestsson et al. | |
| 2010/0279733 | A1* | 11/2010 | Karsten | H04W 48/18 455/552.1 |
| 2012/0077496 | A1* | 3/2012 | Mathias | G06Q 30/06 455/435.1 |
| 2012/0155380 | A1 | 6/2012 | Hodges | |
| 2012/0289151 | A1 | 11/2012 | Wu | |
| 2013/0085873 | A1 | 4/2013 | Garcia Puga et al. | |
| 2013/0231146 | A1 | 9/2013 | Mathias et al. | |

* cited by examiner

*Primary Examiner* — Jamal Javaid
*Assistant Examiner* — Thad N Defauw
(74) *Attorney, Agent, or Firm* — BakerHostetler (57) ABSTRACT

The present application describes a method and system for modifying APN settings on a wireless device for connecting to a cellular data network. The wireless device includes a device management application. The wireless device displays an APN code on a display. The device management application determines when a user has provided the APN code thereto. The device management application confirms the validity of the received APN in order to gain access to the cellular data network.

19 Claims, 6 Drawing Sheets

SYSTEM AND METHOD FOR MODIFYING SETTINGS ON WIRELESS DEVICES

CROSS REFERENCE TO PRIOR APPLICATIONS

This application is a continuation of the U.S. patent application Ser. No. 14/643,575, filed Mar. 10, 2015 now U.S. Pat. No. 9,955,323 issued Apr. 24, 2018, which is incorporated herein by reference in its entirety. This application also claims the benefit from U.S. Provisional Application No. 61/950,532 filed on Mar. 10, 2014, which is hereby incorporated by reference for all purposes as if fully set forth herein.

BACKGROUND OF THE DISCLOSURE

1. Field of the Disclosure

This application generally relates to a method and system for modifying network settings on a wireless device. This application also generally relates to a hardware configuration, firmware configuration, and/or software application on a wireless device for modifying network settings.

2. Related Art

The access point name, otherwise known as "APN," is the network path between a cellular data network and an external network, such as the public Internet. A wireless device seeking to use data must be configured with a specific APN in order to communicate with a cellular data network provided by a mobile network operator (MNO) and/or mobile virtual network operator (MVNO). The APN information is reviewed by the MNO or MVNO to acknowledge and configure the type of connection to employ for the wireless device including but not limited to assigning an IP address and assessing the level of security to employ.

Generally, an APN includes two parts. The first part is a network identifier defining an external network, such as the internet, which the wireless device desires to connect. The first part is mandatory. An optional second part is an operator identifier defining the operator's packet domain network. The operator identifier may include a mobile country code (MCC) and a mobile network code (MNC). The MCC and MNC assist with identifying the MNO or MVNO.

Upon initiating services with a MNO or MVNO, network incompatibility is a drawback to many end users desiring quick and easy access to a cellular data network, and ultimately the public internet. Network incompatibility may arise from the inability to efficiently change the APN directly from the wireless device. For example, wireless devices, such as smartphones, typically require connecting to a desktop or laptop computer in order to reconfigure the APN settings. That is, a configuration profile located on the computer is selected and transferred to the wireless device for installation thereon. The user then selects 'Install' on the wireless device to install the configuration profile for obtaining the APN. However, this process requires additional hardware and takes much time to set up.

Recently, APN applications have become available on the public Internet permitting installation of new configuration profiles directly on wireless devices, such as smartphones. For example, upon obtaining a Wi-Fi signal on their wireless devices, users download APN changing software from the public Internet from sites such as www.unlockit.co.nz. However, users may not always have direct access to a Wi-Fi signal to download the APN changing software. This may be the case when a user purchases a SIM card during travel and does not have access to Wi-Fi or a wired connection.

A need therefore exists in the art for a system and method for reducing the external hardware required to update APN settings on a wireless device. Moreover, a need also exists in the art for a system and method for reducing the time required to update APN settings on a wireless device. A further need exists for a system and method for obtaining APN settings on a wireless device in the absence of external hardware, a wired Internet connection, or an available Wi-Fi signal.

SUMMARY OF THE INVENTION

One aspect of the application provides a method for modifying APN settings on a wireless device for connecting to a cellular data network including providing a wireless device including a memory for storing applications, providing the wireless device with a device management application, receiving an APN code in a SMS from a network operator, providing the device management application with the received APN code, confirming validity of the received APN code by the device management application, and populating the memory of the wireless device with the APN code to gain access to the cellular data network.

The method may include removing prior APN settings utilizing the device management application. The method may include storing the APN utilizing at least one of the device management application and the wireless device such that the APN remains stored during a hard restart. The confirming step may include checking the expiration date of the APN code. The method may include alerting a network operator that the APN code is invalid after the confirming step to receive a new APN code. The method may include directly receiving the new APN code directly by the device management application. The method may include automatically confirming validity of the new APN code received by the device management application without prompting the user. The wireless device may be a pre-paid phone with wireless network services provided by a mobile virtual network operator. The wireless device may be selected from a smartphone, a tablet, and a personal digital assistant.

In another aspect of the application, there is described a wireless device configured for modification of APN settings for connecting to a cellular data network including a memory for storing applications, a processor configured to execute a device management application, a transceiver configured to receive an APN code in a SMS from a network operator, the processor configured to receive the APN code, the processor configured to determine a validity of the received APN code, and the memory configured to store the APN code to gain access to the cellular data network.

The processor may remove prior APN settings utilizing the device management application. The processor may store the APN utilizing such that the APN remains stored during a hard restart. The processor may check an expiration date of the APN code. The processor may alert a network operator that the APN code is invalid after receiving a new APN code that is invalid. The processor may be configured to directly receive the new APN code by the device management application. The processor may be further configured to automatically confirm validity of the new APN code received by the device management application without prompting the user. The wireless device may be a pre-paid phone with wireless network services provided by a mobile virtual network operator. The wireless device may be selected from a smartphone, a tablet, and a personal digital assistant.

In yet another aspect of the application, there is a wireless device configured for modification of APN settings for connecting to a cellular data network including means for providing a memory for storing applications, means for implementing a device management application, means for receiving an APN code in a SMS from a network operator, means for providing the device management application with the received APN code, means for confirming validity of the received APN code by the device management application, and means for populating the memory of the wireless device with the APN code to gain access to the cellular data network. The wireless device may include means for removing prior APN settings utilizing the device management application.

There has thus been outlined, rather broadly, certain aspects of the invention in order that the detailed description thereof herein may be better understood, and in order that the present contribution to the art may be better appreciated. There are, of course, additional aspects of the invention that will be described below and which will form the subject matter of the claims appended hereto.

In this respect, before explaining at least one aspect of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the invention. It is important, therefore, that the claims be regarded as including such equivalent constructions insofar as they do not depart from the spirit and scope of the invention.

DETAILED DESCRIPTION

As an initial matter, reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not other aspects.

It is to be understood that the system and method described in this application may be employed in various forms of hardware, software, firmware, special purpose processors, or a combination thereof. The application in one aspect is directed to a process and system utilizing a device management software application including executable code that is operably stored on one or more program storage devices including but not limited to a magnetic floppy disk, RAM, ROM, CD ROM, and/or Flash memory.

The mobile application described in this application is executable by any wireless-ready device including but not limited mobile phones, tablet computers, gaming systems, MP3 players and the like. Reference to a "wireless device" is intended to encompass any compatible mobile technology computing device that connects to a wireless communication network, such as mobile phones, mobile equipment, mobile stations, user equipment, cellular phones, smartphones, handsets or the like (e.g., Apple iPhone, iPad, Google Android based devices, BlackBerry based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Wireless devices, such as, for example mobile phones, access networks via service providers. Some companies provide postpaid wireless services, such as mobile phone and data service. As discussed above, these providers can be wireless carriers or Mobile Network Operators (MNO) that maintain and control their own wireless networks. An MNO relies heavily on backend systems to address any provisional, billing, security, and data issues that might threaten the health of their networks.

A Mobile Virtual Network Operator (MVNO), as discussed above, is a mobile operator that typically does not own its own frequency spectrum and typically does not have its own network infrastructure. Instead, MVNOs have business arrangements and contracts with third party wireless carriers to purchase usage of their networks, minutes of use, volume of data transfer, number of SMS messages, etc. Such services may then be sold to end users, e.g., subscribers.

Figure 1:
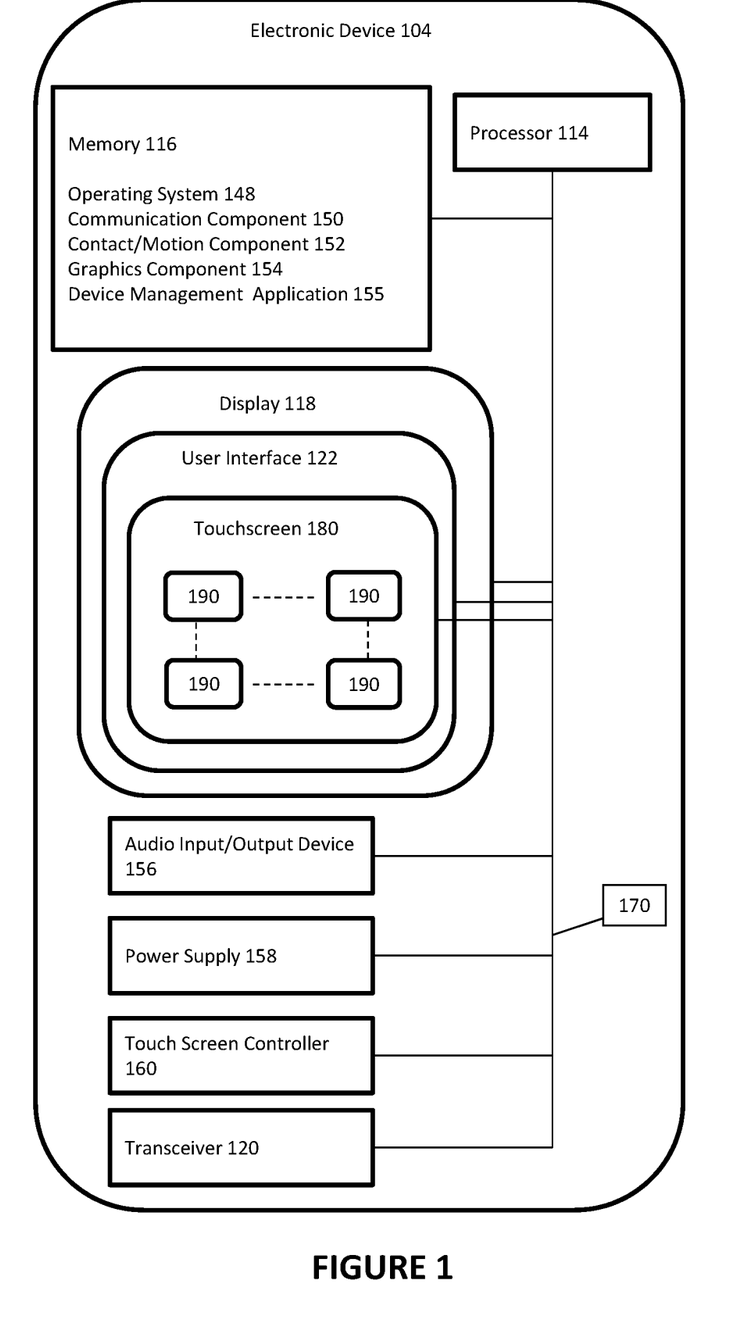
FIG. 1 illustrates a mobile smartphone in accordance with an aspect of the invention.

FIG. 1 illustrates an exemplary wireless device 104, such as a mobile smart phone, which may be employed in many aspects of this application. The wireless device 104 includes a processor 114, memory 116, display 118, user interface 122, and the like. The processor 114 may be a central processing unit configured to execute instructions, such as, for example, instructions related to software programs.

The display 118 may be a liquid crystal display having a backlight to illuminate the various color liquid crystals to provide a colorful display. The user interface 122 may be any type of physical input having buttons and further may be implemented as a touchscreen 180.

The wireless device 104 may further include in the memory 116, an operating system 148, a communication component 150, a contact/motion component 152, a graphics component 154, and the like. The operating system 148 together with the various components provides software functionality for each of the components of the wireless device 104.

The memory 116 may include a high-speed, random-access memory. Also, the memory 116 may be a non-volatile memory, such as magnetic fixed disk storage, flash memory or the like. These various components may be connected through various communication lines including a data bus 170.

Additionally, the wireless device 104 may include an audio input/output device 156. The audio input/output device 156 may include speakers, speaker outputs, and in the like, providing sound output; and may include microphones, microphone inputs, and the like, for receiving sound inputs. The audio input/output device 156 may include an analog to digital converter and a digital to audio converter for audio input and output functions respectively.

When implemented as a wireless device, the wireless device 104 may include a transceiver 120. The wireless device 104 may provide radio and signal processing as needed to access a network for services utilizing a communication channel. The processor 114 may be configured to process call functions, data transfer, and the like and provide other services to the user.

In an exemplary aspect, the touchscreen 180 of the invention may be implemented in the display 118 and may detect a presence and location of a touch of a user within the display area. For example, touching the display 118 of the wireless device 104 with a finger or hand. The touchscreen 180 may also sense other passive objects, such as a stylus.

In operation, the display 118 may display various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of the objects 190 for the user to interact with. Moreover, the display 118 may include a plurality of screens. The display 118 showing one screen at a time. The user may interact with the display 118 to move a screen into view on the display 118. Various objects 190 may be located in each of the screens.

The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) that provides an easy to use visual interface between a user of the wireless device 104 and the operating system or application(s) running on the wireless device 104. Generally, the GUI presents programs, files, and operational options with graphical images. During operation, the user may select and activate various graphical images displayed on the display 118 in order to initiate functions and tasks associated therewith.

In another aspect of the application, the memory 116 of a wireless device 104 includes a database storing user information. The user information is exemplary, and may include further information as required by the service provider and may include information such as full name, address, date of birth, social security number, driver's license state and number, email address, contact number, credit card information, and/or the like. In one aspect, the database may include security questions. In another aspect, the database may include user specified preferences.

In another aspect of the application, the memory 116 of a wireless device 104 includes a device management software application 155. In one aspect, the wireless device 104 is a hand-held device. In another aspect, the hand-held device is a smartphone. In a further aspect, the smartphone is a device utilizing pre-paid wireless network services obtained from a MVNO.

Figure 2:
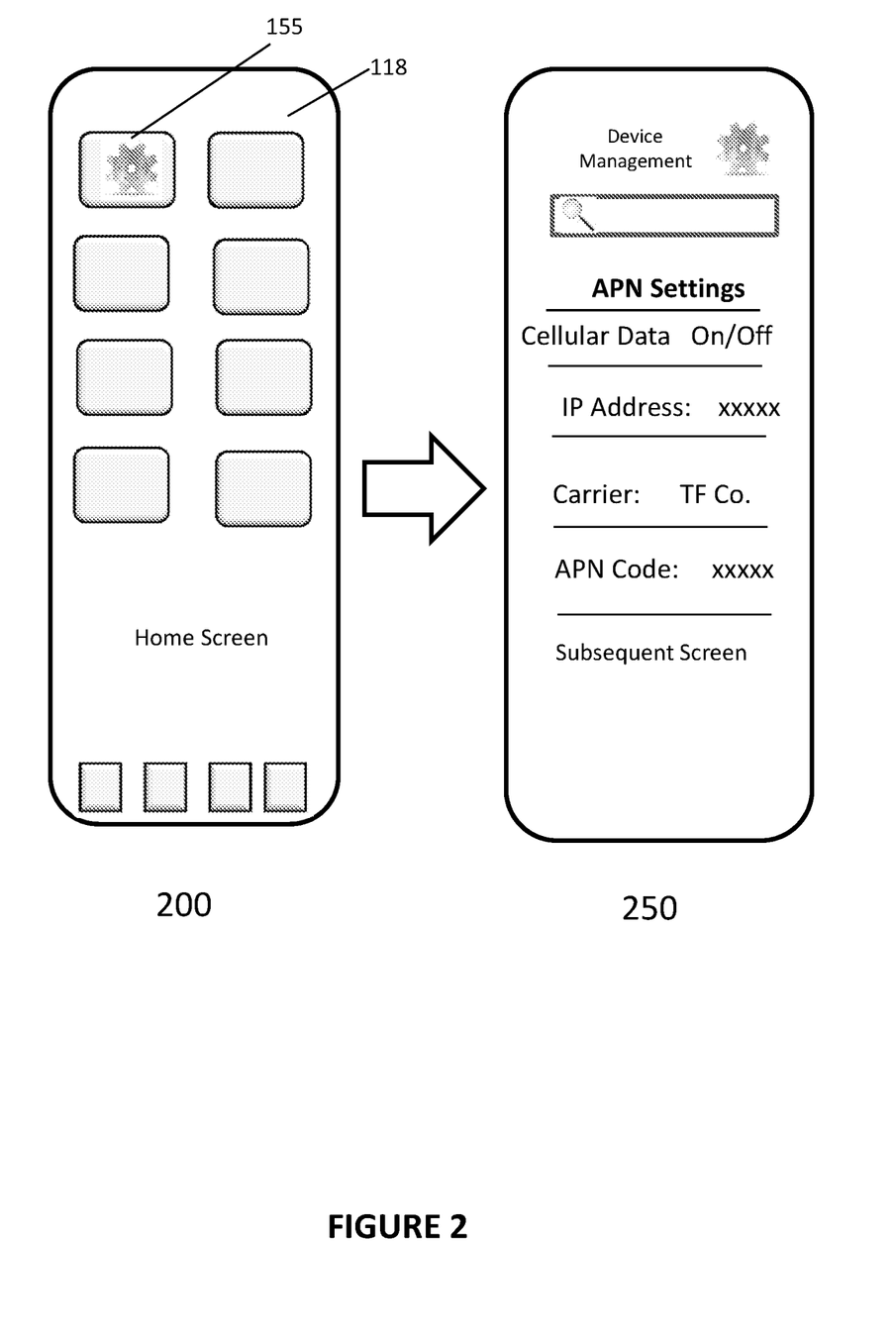
FIG. 2 illustrates a home screen and subsequent screen for a device management application in accordance with an aspect of the invention.

In an exemplary aspect as shown in FIG. 2, the device management software application 155 may be installed and viewable on a main screen 200 of display 118. Application 155 may be illustrated, for example, as a gear. Tapping or selecting application 155 directs the user to a subsequent screen 250 providing further details of the device management software application 155. In an exemplary aspect, this subsequent screen 250 may be a secondary screen following the main screen 200. In an alternative aspect, subsequent screen 250 may be a tertiary or quaternary screen following the main screen 200.

As illustrated in FIG. 2, the application provides APN settings for the wireless device 104. In one aspect of the application 155, the instructions, i.e., code, for a device management application 155 are stored locally in the memory 116 of a wireless device 104.

In one aspect, the APN information may manually be entered to obtain access to the cellular data network. If the APN information is correct, an IP address will populate. By so doing, the MNO or MVNO grants access to the user to use the cellular data network for accessing external networks including, for example, the public Internet.

In another aspect, the software is capable of detecting an APN code transmitted to the wireless device 104 via an SMS service, e.g., text messaging. Specifically, the APN code may be sent to the user from the MNO or MVNO. Namely, the MNO or MVNO may send the APN code after receipt of information that the user has requested cellular data service and paid for it. Payment for cellular data service may be either on a contract or no-contract basis, and may employ SIM cards. In a further exemplary aspect, the APN code may be provided as a hyperlink. Application 155 is configured to identify the APN code upon tapping, executing thereof, or automatically. If the application 155 determines that the APN code agrees with the settings on the wireless device 104, the APN code is maintained in the APN box located on the secondary screen 250 or in APN memory. An IP address may then automatically be populated on the secondary screen 250 in order for gaining access to the cellular network.

If the application 155 determines that the APN code does not agree with the permissions granted by the MNO or MVNO, the APN code will be removed from the APN box located on the secondary screen 250 or in APN memory. In an exemplary aspect, the user is prompted to reenter the APN code either by re-tapping on the hyper-linked code sent by the MNO or MVNO or directly entering the APN code on the subsequent screen 250. If problems persist with obtaining an APN code, the user may be advised via a pop up window from the device management application 155 to contact the system administrator.

One or more reasons may be attributed to the APN code being denied by the device management application. For example, the user may have run out of cellular data minutes. This may require re-charging the allotted data minutes remaining in order for access to be granted. Alternatively, the APN code may have timed-out after a predetermined period of time. In one aspect, the code may be valid for 1 week. In another aspect, the code is valid for 1 month. In this instance, a new code may have to be requested from the MNO/MVNO.

Figure 3:
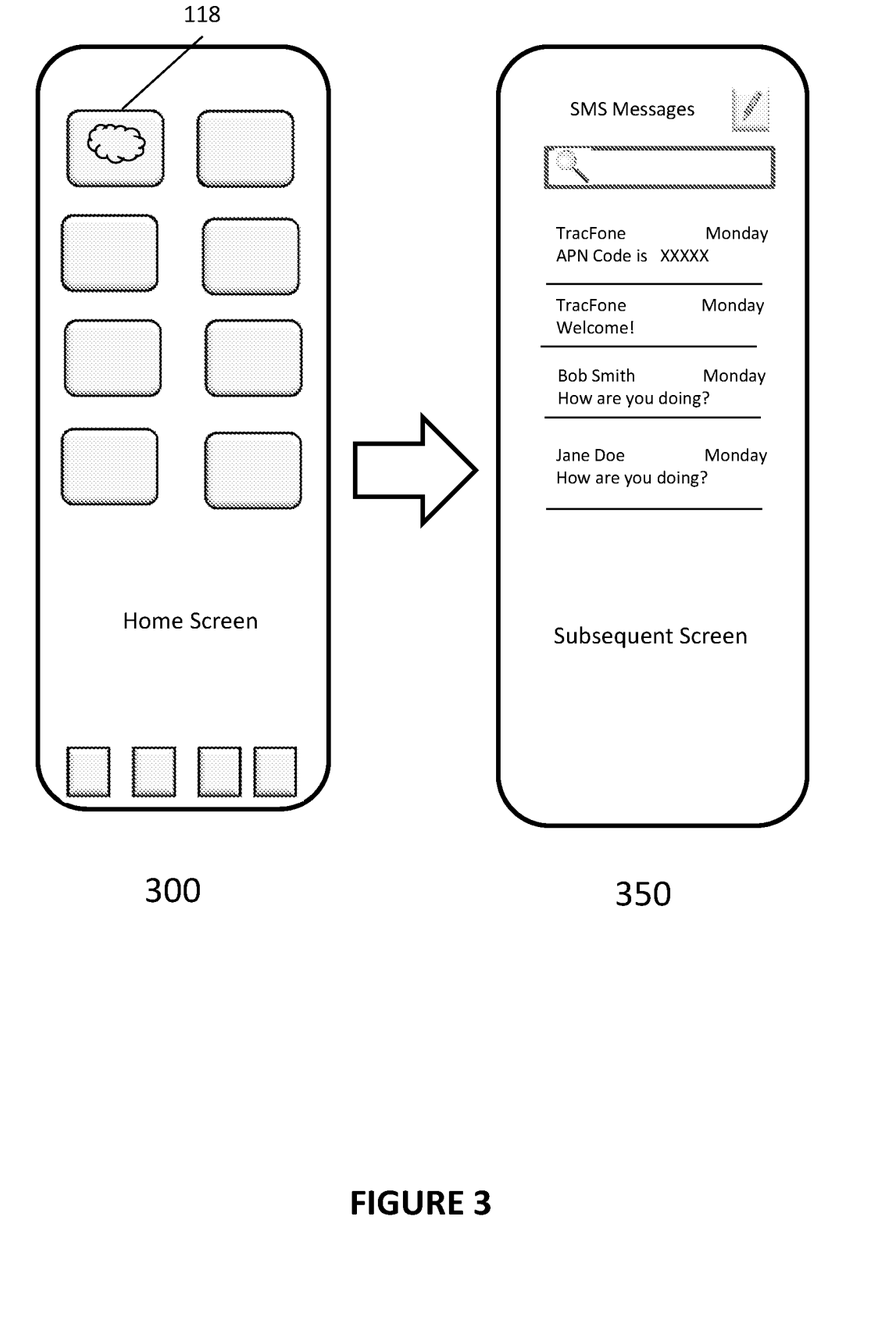
FIG. 3 illustrates a home screen and subsequent screen for a SMS application in accordance with an aspect of the invention.

According to another aspect of the invention, the MNO or MVNO provides the wireless device 104 with an APN code. In an exemplary aspect as shown in FIG. 3, an icon 301 representing the SMS application is displayed on a home screen 300 of the wireless device 104. In one aspect, the wireless device 104 is a hand-held device. In a further aspect, the hand-held device is a smartphone. In yet another aspect, the smartphone is a device utilizing pre-paid wireless network services obtained from a MVNO.

In an exemplary aspect, the SMS application 301 may be accessed by directly tapping thereon. In a subsequent screen 350, the user's text messaging history is provided along with a feature to compose new text messages, e.g. pencil icon. As illustrated in subsequent screen 350, a MVNO has sent an APN code to the user. In one aspect, the APN code is hyper-linked.

In another aspect, upon the user tapping or executing the hyper-linked code, the device management software application is alerted, and automatically retrieves the APN code and populates the APN box shown in subsequent screen 350. In an alternative aspect, the APN code is not hyper-linked. In this instance, the user manually or electronically copies the APN code into the APN box located on subsequent screen 250.

In another aspect of the application, the device management software confirms whether the APN settings are valid. Specifically, an assessment is made as to whether the APN code has expired. That is, APN codes may have different expiration dates in accordance with the MNO or MVNO. If the code is valid, the application 155 maintains the APN code in the APN box and provides an IP address in the IP address box located in the subsequent screen 250. By so doing, the user is granted access to use the cellular data network provided by the MNO or MVNO.

If, on the other hand, the user provides the device management application 155 with the APN code after the expiration date, the APN code is rejected by the application. In one aspect, the application 155 removes the APN code from the APN box located in the subsequent screen 250. In an alternative aspect, the application 155 retains the APN code in the APN box. In another aspect, the application 155 prompts the user for another APN code, such as with a pop-up box.

In another aspect, the APN code may be considered invalid in view of the user's depleted data time/minutes. In this instance, the user may re-charge the account to add minutes. In one aspect, the APN code sent from the MNO or MVNO may still be used so long as the predetermined expiration date has not passed. In an alternative aspect, a request may need to be sent to the MNO or MVNO to send another APN code for accessing the network. Once another code is sent to the user via SMS, the user may attempt once again to configure the wireless device 104 to obtain cellular data.

In another aspect of the application, the device management application is configured to prompt the user to recharge the data minutes available on the account. In an exemplary aspect, the application 155 requests from the user whether credit or debit card information stored in the memory may be used to recharge data. A security feature may be employed in this aspect.

In a further exemplary aspect, once the user recharges the account, the device management application may communicate directly with the MNO/MVNO to confirm whether the user may be granted access to the cellular data network. Depending upon the expiration date of the APN code based upon the MNO/MVNO's specific criteria, the user may be granted access to the cellular data network. Alternatively, upon being contacted by the application 155, the MNO/MVNO may send an updated APN code to the user. The user will then need to launch the APN code. In an alternative aspect, the updated APN code may be sent directly to the device management application 155, which may be confirmed for assigning an IP address to the user to gain access to the cellular data network.

Similar to the scenario of having depleted data minutes, an expired APN code may also be directly or indirectly handled by the device management application 155. For example, if the application 155 determines the APN code has expired, the application 155 may directly send an inquiry to the MNO/MVNO to request an updated APN. An updated APN may then be sent to the user via SMS, or alternatively, directly to the application 155 for inquiring and confirming its validity. By so doing, the application 155 helps facilitate faster access to a cellular data network by a user.

In yet another aspect of the application, the device management application 155 is configured to update other settings in addition to APN settings of the device. For example, the application 155 may be configured to identify, confirm, and update settings including but not limited to MMS, Bluetooth, Wi-Fi, GPS, Voicemail, SMS, personal settings, and other basic settings on the phone.

Additionally, the device management application 155 may be configured to remove APN settings. In particular, remove APN settings that are undesirable or not needed. For example, remove APN settings that a user and/or a hacker may install.

Figure 4:
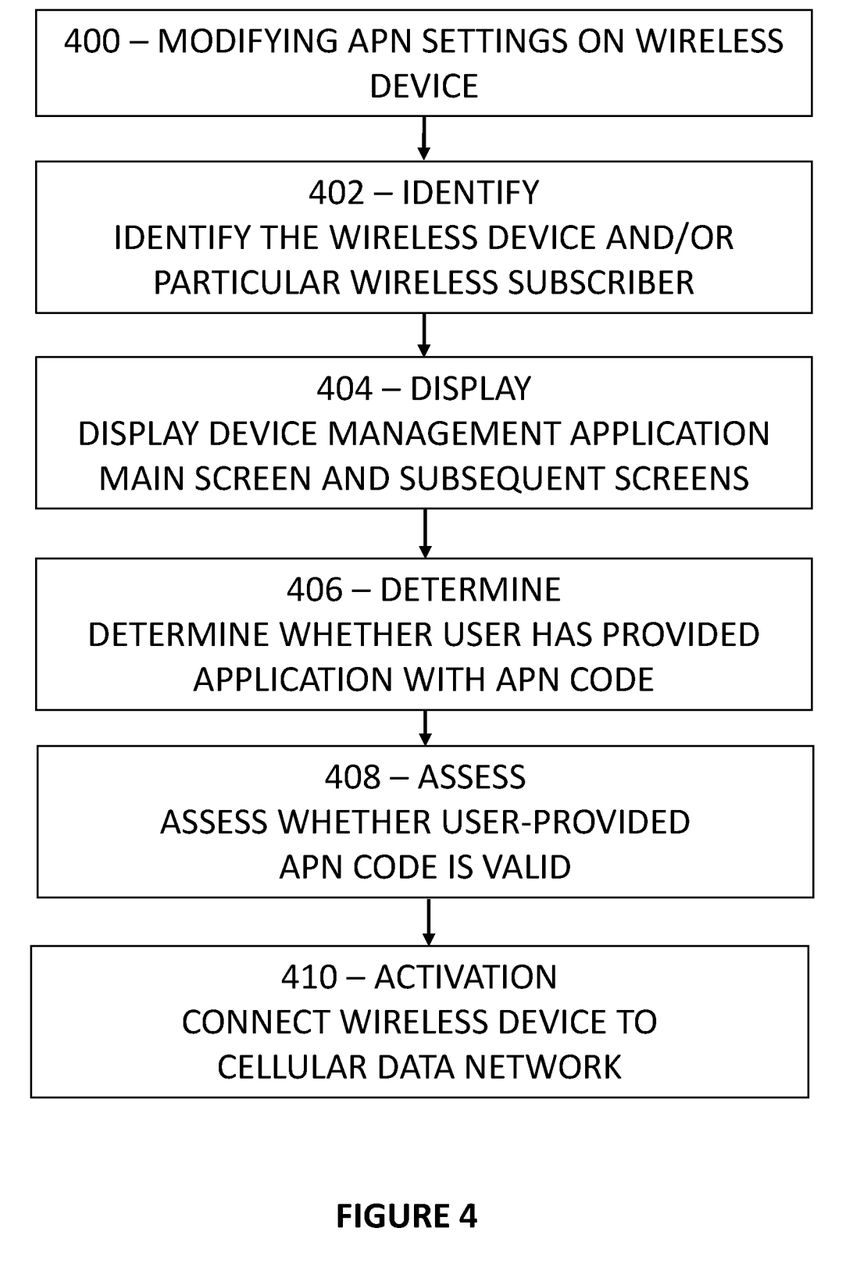
FIG. 4 illustrates exemplary steps in accordance with an aspect of the invention.

As illustrated in FIG. 4, an exemplary hierarchy chart is provided showing application software employed for modifying APN settings on a wireless device 400. Box 402 illustrates instructions whereby the device management application identifies the wireless device 104 and the wireless subscriber. Box 404 illustrates instructions whereby the device management application's main screen 200 and subsequent screens are displayed on a display 118 of a wireless device 104 for user review. Box 406 illustrates instructions wherein a determination is made when a user has provided the APN code received from the MNO or MVNO to device management software. Box 408 illustrates instructions whereby a determination is made whether the APN code is valid in view of the factors discussed above. Box 410 illustrates instructions whereby a user is granted access to the cellular data network upon verification of the APN code.

In yet another aspect of the application, the confirmed APN code is maintained in the settings after a factory reset, e.g., hard reset. That is, if the wireless device requires cleaning the system to remove a virus, the APN code is maintained. By so doing, the user does not have to spend time contacting the network operator to send another APN code.

Figure 5:
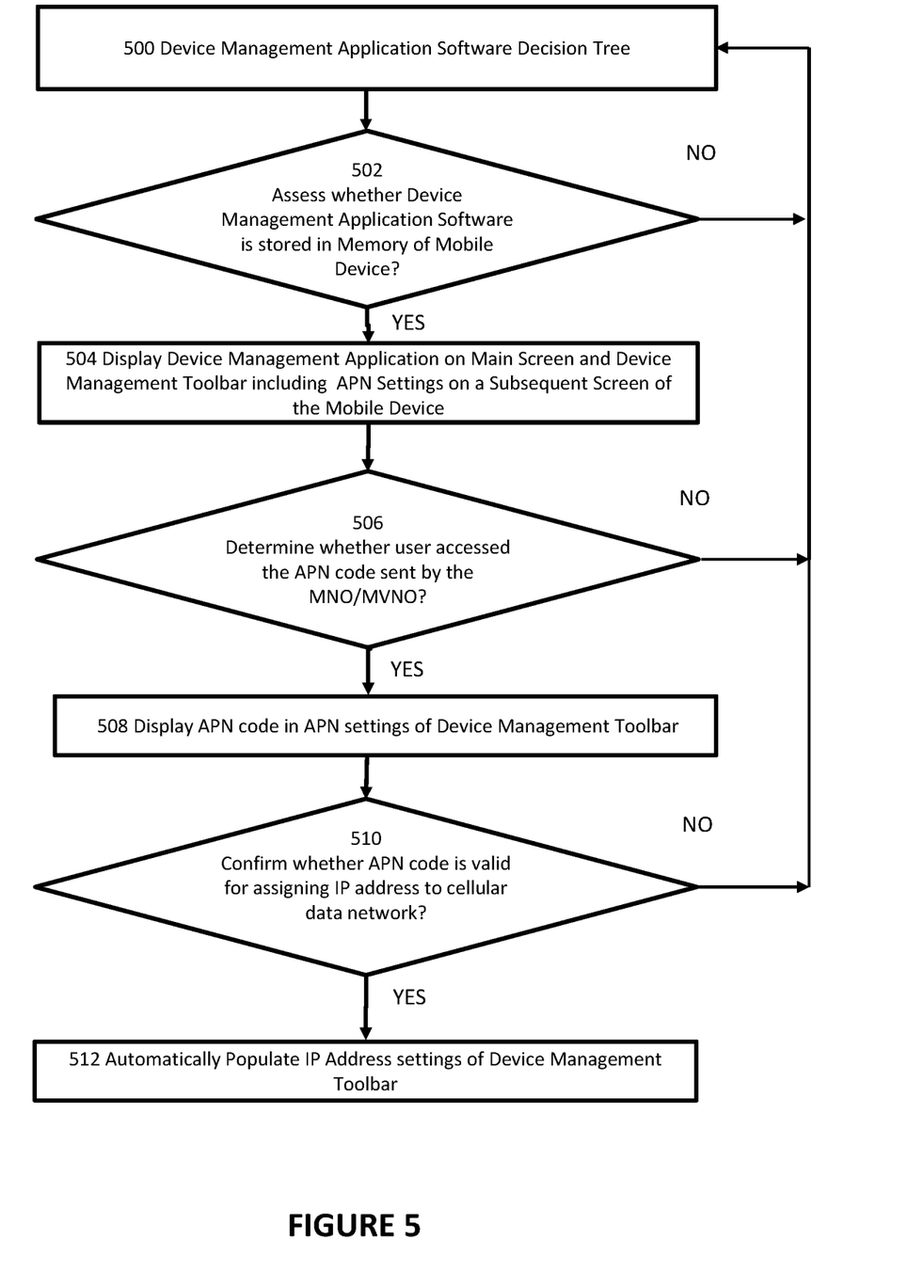
FIG. 5 illustrates an exemplary decision tree for the software program in accordance with an aspect of the invention.

FIG. 5 illustrates a decision tree 500 for the process of the master application. The first decision box 502 of the process assesses whether the software is located and stored in the memory of the device. According to box 504, if the software program concludes in the affirmative, the device management application along with the subsequent screens is configured to be displayed on the display 118. The initial screen includes a shortcut application for the device management application 155. Alternatively, the application may be located under the applications tab. In an exemplary aspect, the subsequent screen directly follows the initial screen, which displays the device management application.

On the other hand, if the software program concludes in the negative, the process is returned to box 500. At this stage, the application may be required to be installed onto the wireless device. In an exemplary aspect, the application is pre-installed on the wireless device 104.

Next, the process queries whether the user has accessed the APN code sent by the MNO/MVNO in box 506. As described above, the user accesses the APN code either by tapping or executing a hyper-linked copy, if available, or, physically or electronically copying the APN code into the APN box located on a subsequent screen of the device management application. If the application process concludes in the affirmative, the APN code is displayed in the APN box. On the other hand, if the device management application concludes that the user has not accessed the APN code sent by the MNO/MVNO, the process is returned to box 500.

A further step of the process, as illustrated by box 510, queries whether the APN code provided by the MNO/MVNO is valid. If the APN code is confirmed as illustrated in Box 512, the APN code provided in the APN box is maintained. In addition, an IP address is generated in accordance with the settings set forth by the MNO or MVNO. While APN codes sent to the MNO or MVNO generally are valid, user delay or deficient supply of data minutes may cause the APN code to be rejected by the device management application 155.

As described above in more detail in an exemplary aspect, the application prompts the user to update the deficient data minutes via a secure website. This feature may be accessible if the user's credit card or debit card information is on file. By so doing, the application automatically generates an alert, which is sent directly to the MNO or MVNO. Based upon the expiration date requirements of the APN code, the MNO or MVNO may send another APN code directly to the user without the user having to contact the MNO or MVNO. This process may be performed instantaneously to reduce or eliminate lag time.

In another aspect of the invention in this application, there is disclosed a system for improving interaction between device management software stored in the memory on a wireless device and MNO/MVNOs for gaining user access to a cellular data network. The smartphone device also includes a processor. The processor may be operatively coupled to the memory, e.g., data storage unit. The processor may execute the device management application stored on the memory. The code of the device management application is configured to perform the steps of: (i) displaying the application and sub screens on a display of the smartphone device; (ii) determining that a user has accessed an APN code received by a MNO/MVNO; (iii) displaying APN codes in input fields located on subsequent screens of the device management application; and confirming the validity of the APN code.

In an exemplary aspect, the memory element of the system may include but is not limited to a memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like.

The processor 114 may be a central processing unit configured to execute instructions including instructions related to software programs. The processor may be configured to process call functions, data transfer, and the like and provide other services to the user.

In an exemplary aspect, the processor 114 may be implemented in any type of mobile smartphone that may be operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

In yet another aspect of the application there is disclosed a non-transitory computer-readable or processor-readable medium including a software program as described in the application above. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein.

In an exemplary aspect, the computer readable medium stores computer data, which data can include computer program code that is executable by a processor of the SIM or wireless device, in machine readable form. In one or more aspects, the actions and/or events of a method, algorithm, or module may reside as one or any combination or set of codes and/or instructions on a computer readable medium or machine readable medium, which may be incorporated into a computer program product. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device.

In another exemplary aspect of the aspect of the application, there is disclosed a computer readable medium, which embodies a program of instructions executable by a wireless device. In one aspect, the wireless device is a smartphone device. The program of instructions is configured so as to perform the steps of modifying APN settings on a wireless device 104. The program including the steps of: (i) displaying the application and sub screens on a display of the smartphone device; (ii) determining that a user has accessed an APN code received by a MNO/MVNO; (iii) displaying APN codes in input fields located on subsequent screens of the device management application; and confirming the validity of the APN code.

Figure 6:
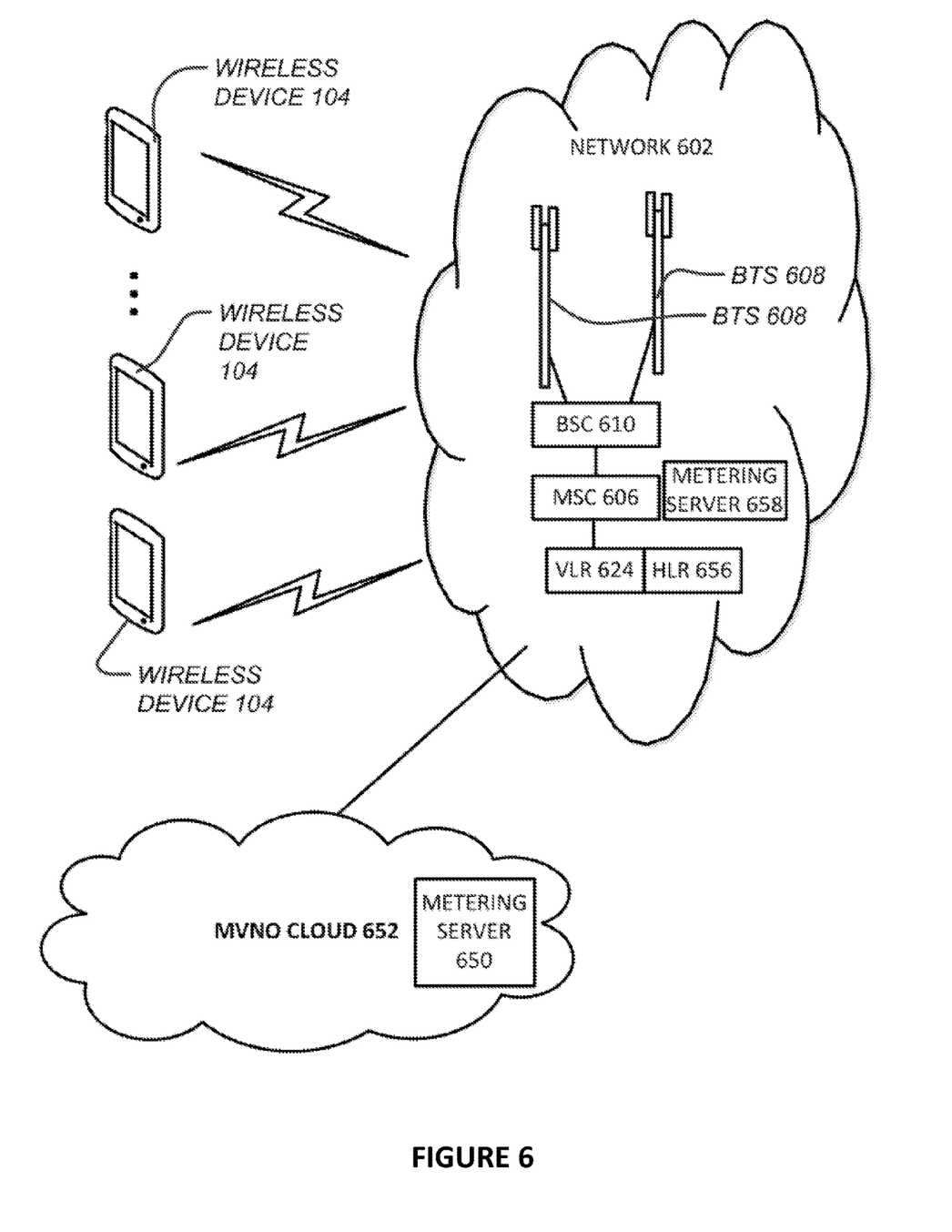
FIG. 6 illustrates a network and an electronic device according to one aspect of the invention.

FIG. 6 illustrates a network and an electronic device according to one aspect of the invention. Electronic devices 104, such as, for example mobile phones, access networks via service providers. Some companies provide postpaid wireless services, such as mobile phone and data service. These providers can be wireless carriers or Mobile Network Operators (MNO) that maintain and control their own wireless networks. An MNO relies heavily on backend systems to address any provisional, billing, security, and data issues that might threaten the health of their networks. A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks, minutes of use, volume of data transfer, number of SMS messages, etc. Such services may then be sold to end user, e.g., subscribers. The MNO may include a network 602 having at least one BTS 608, a BSC 610, MSC 606, the VLR 624, HLR 656, and the like. When implemented with an MVNO, a system may include a MVNO cloud 652, a metering server 650, and/or metering server 658, and the like.

The application may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), 4G-LTE, Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

What is claimed is:

1. A method for modifying Access Point Name (APN) settings on a wireless device for connecting to a cellular data network comprising:
   providing a wireless device including a memory for storing applications, a display, a transceiver, and a processor for executing the applications;
   providing the wireless device with a device management application;
   displaying a graphical user interface on the display in response to executing the device management application with the processor;
   displaying current APN settings in the graphical user interface on the display in response to executing the device management application with the processor;
   implementing a Short Message Service (SMS) application executed by the processor, the SMS application configured to receive an APN code via an SMS message received by the transceiver;
   receiving the APN code in the SMS message received by the transceiver from a network operator;
   detecting a receipt of the APN code with the device management application;
   executing the device management application with the processor in response to the detecting the receipt of the APN code in the SMS message;
   displaying the APN code in the SMS application as a hyperlink;
   executing the device management application in response to a user tapping the hyperlink;
   providing the device management application with the received APN code by operation of the processor;
   confirming validity of the received APN code by the processor implementing the device management application;
   populating an IP address for gaining access to a network with the device management application in response to the confirming validity of the received APN code;
   populating the memory of the wireless device with the APN code to gain access to the cellular data network; and
   storing the APN code utilizing at least one of the device management application and the wireless device such that the APN code remains stored during a hard restart,
   wherein the confirming validity includes checking an expiration date of the APN code.

2. The method according to claim 1, further comprising:
   determining by a server implemented by the network operator that a user has requested and paid for wireless service;
   sending the APN code in the SMS message to the wireless device by the server of the network operator; and
   removing prior APN settings utilizing the device management application implemented by the processor,
   wherein the confirming validity of the received APN code comprises determining that the received APN code agrees with settings on the wireless device.

3. The method according to claim 1, further comprising:
   populating an IP address for gaining access to a network with the device management application implemented by the processor in response to the confirming validity of the received APN code; and
   storing the APN code utilizing at least one of the device management application and the wireless device such that the APN code remains stored during a hard restart.

4. The method according to claim 1,
   wherein the confirming validity includes checking an expiration date of the APN code with the device management application.

5. The method according to claim 1, further comprising:
   alerting the network operator that the APN code is invalid after the confirming validity to receive a new APN code,
   wherein the confirming validity of the received APN code comprises determining that the received APN code agrees with settings on the wireless device, the APN code is not expired, and a user has sufficient wireless service with the device management application.

6. The method according to claim 1, further comprising:
   displaying the graphical user interface on the display in response to executing the device management application with the processor, the graphical user interface configured to manually receive entry of the APN code, wherein the wireless device is a pre-paid phone with wireless network services provided by a mobile virtual network operator.

7. The method according to claim 1, further comprising:
determining that the APN code is invalid based on a depleted wireless service; and
prompting a user in response to executing the device management application with the processor to recharge wireless service,
wherein the wireless device comprises one of the following: a smartphone, a tablet and a personal digital assistant.

8. The method according to claim 5, further comprising:
directly receiving the new APN code directly by the device management application,
wherein the confirming validity of the received APN code comprises determining that the received APN code agrees with the settings on the wireless device, the APN code is not expired, and the user has the sufficient wireless service.

9. The method according to claim 8, further comprising:
automatically confirming validity of the new APN code received by the device management application without prompting the user,
wherein the confirming validity of the received APN code comprises determining that the received APN code agrees with the settings on the wireless device, the APN code is not expired, and the user has the sufficient wireless service.

10. A wireless device configured for modification of Access Point Name (APN) settings for connecting to a cellular data network comprising:
a memory for storing applications including a device management application;
a processor configured to execute the device management application;
a display configured to display a graphical user interface in response to executing the device management application with the processor;
a transceiver configured to receive an APN code in a Short Message Service (SMS) message from a network operator;
the processor configured to receive the APN code from the transceiver received in the SMS message from the network operator;
the processor configured to detect the APN code in the SMS message from the network operator;
the processor configured to determine a validity of the received APN code; and
the memory configured to store the APN code to gain access to the cellular data network,
wherein the processor is configured to execute a SMS application, the SMS application being configured to receive the APN code in the SMS message from the network operator;
wherein the display is configured to display the APN code in the SMS application as a hyperlink;
wherein the processor is configured to execute the device management application in response to a user tapping the hyperlink in the SMS message from the network operator; and
wherein the processor is configured to populate the memory of the wireless device with the APN code to gain access to the cellular data network.

11. The wireless device according to claim 10, wherein the processor is configured to remove prior APN settings utilizing the device management application.

12. The wireless device according to claim 10, wherein the processor is configured to populate an IP address for gaining access to a network with the device management application in response to the determining validity of the received APN code; and
the processor is configured to store the APN code such that the APN code remains stored during a hard restart.

13. The wireless device according to claim 10, wherein the processor is configured to check an expiration date of the APN code.

14. The wireless device according to claim 10, wherein the processor is configured to alert the network operator that the APN code is invalid after receiving a new APN code that is invalid,
wherein the processor is configured to confirm the validity of the received APN code by determining that the received APN code agrees with the settings on the wireless device, the APN code is not expired, and the user has sufficient wireless service.

15. The wireless device according to claim 10,
wherein the display is further configured to display the graphical user interface on in response to executing the device management application with the processor, the graphical user interface being configured to manually receive entry of the APN code; and
wherein the wireless device is a pre-paid phone with wireless network services provided by a mobile virtual network operator.

16. The wireless device according to claim 10,
wherein the processor is configured to determine that the APN code is invalid based on a depleted wireless service;
wherein the processor is configured to prompt the user in response to executing the device management application with the processor to recharge wireless service; and
wherein the wireless device is selected from a smartphone, a tablet and a personal digital assistant.

17. The wireless device according to claim 10, wherein:
the processor is configured to execute the SMS application, the SMS application configured to receive the APN code;
the display is configured to display the APN code in the SMS application as the hyperlink;
the processor is configured to execute the device management application in response to the user tapping the hyperlink;
the processor is further configured to check an expiration date of the APN code;
the processor is configured to populate an IP address for gaining access to the network with the device management application in response to the confirming validity of the received APN code; and
the processor is configured to store the APN code utilizing such that the APN code remains stored during a hard restart.

18. The wireless device according to claim 13, wherein the processor is further configured to automatically confirm the validity of the received APN code received by the device management application without prompting the user,
wherein the processor is configured to confirm the validity of the received APN code by determining that the received APN code agrees with the settings on the wireless device, the APN code is not expired, and the user has sufficient wireless service.

19. The wireless device according to claim 14, wherein the processor is configured to directly receive the new APN code by the device management application,
  wherein the processor is configured to confirm the validity of the received APN code by determining that the received APN code agrees with the settings on the wireless device, the APN code is not expired, and the user has the sufficient wireless service.

* * * * *